3,076,283
TRAWL NET WEIGHTS
Frank J. Luketa, 5567 Greenwood Ave.,
Seattle, Wash.
Filed Aug. 17, 1959, Ser. No. 834,032
11 Claims. (Cl. 43—43.1)

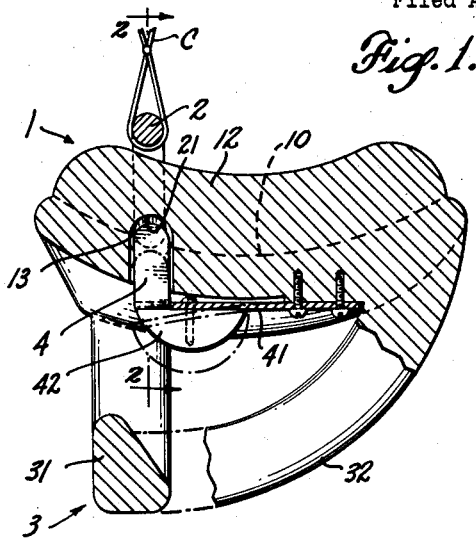
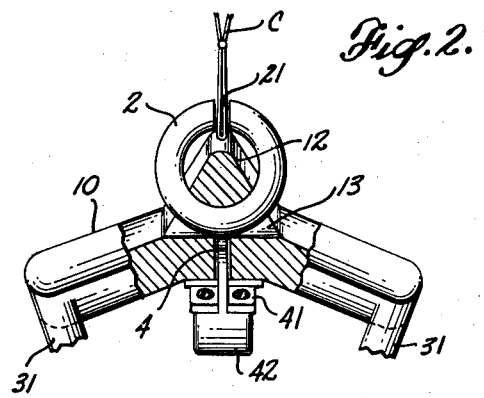
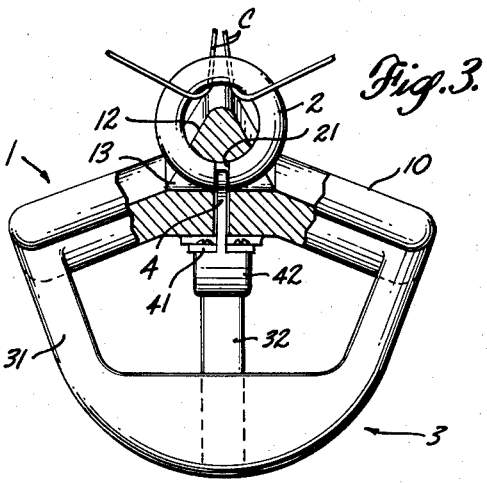
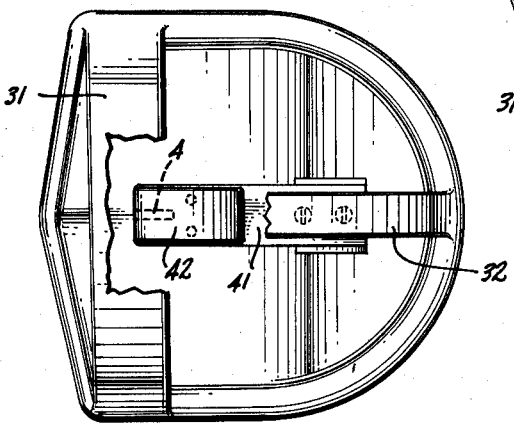
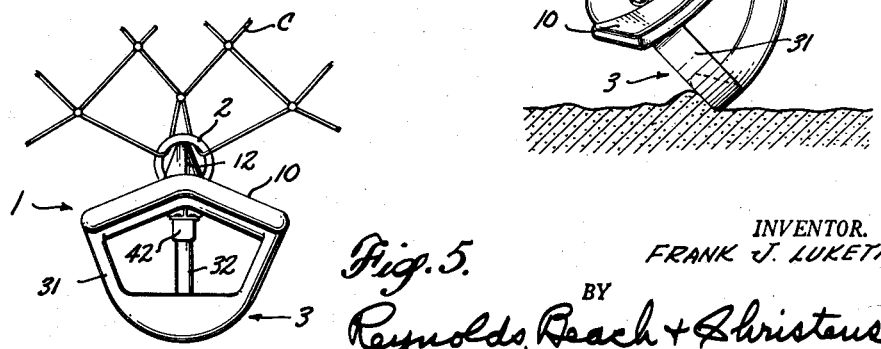
INVENTOR.
FRANK J. LUKETA
ATTORNEYS

United States Patent Office 3,076,283
Patented Feb. 5, 1963

The trawl net which is the subject of a companion application entitled Trawl Net Especially for Bottom Fishing, Serial No. 834,030, filed August 17, 1959, includes side curtains suspended beneath curtain lines, the free lower edges of which curtains sweep close to the bottom, being held down by elements which are primarily water reaction surfaces, but which for want of a better term are called weights. The net is hauled by what is known as the drum trawling method, namely, by reeling in the entire net, with its floats, weights, and all mesh components, including the curtains, upon a winch drum. Because of the manner of hauling the net it is essential that the so-called weights, as well as floats and other accessories, be of small bulk and mass, individually and in the aggregate. They must have no protruding elements that can snag in the meshes when so reeled in. Also, to avoid the use of unnecessary power, the weights and like accessories must create a minimum of drag, yet they must hold the lower edge of the curtain close to the bottom at all times, however irregular in contour it may be, against escape of fish beneath the curtain. Thus the requirement that the curtain edge be surely held down appears to conflict with the requirement that the weights be of small bulk and mass.

The present invention concerns the weight for such use, and resolves the apparent conflict by forming it preferably of light-density material such as aluminum, and of small bulk, but having water reaction or planing surfaces which when it is drawn through the water, and by reason of its orientation by these same surfaces, produce strong downward forces.

It is obvious that such surfaces can only so function when presented in proper orientation to the water, as the net advances. The weight of this invention achieves such orientation by several provisions, among them the use of a short-coupled connection to the net meshes, such as will orient the weight; the use of keel-like surfaces to guide the weight's advance in the line of drag; and the provision of a non-mudding bottom-engaging cage (one that resists digging into the bottom) that tends also to orient the weight and its water-reaction surfaces correctly as it drags along and over the bottom.

The trawl net and its curtains are so designed and constructed as to minimize the likelihood and extent of snagging, yet some such damage is to be expected occasionally. The weight of this invention is made to remain in secure engagement with the mesh of the net, against unintended disengagement, despite the fact that it drags the bottom, yet to enable quick disengagement and reengagement when necessary to effect repairs, or replacement of a damaged curtain by a spare. Also, the disengaging means is protected against unintended release by its location within the cage.

The manner of securement of the weight to the lower edge of the net, and the type of lower edge to which the weight is secured, minimizes damage to the net should a weight snag on the bottom, and confines the damage to a few meshes in the vicinity of the point of securement, rather than producing a long run across the mesh, as has heretofore been common.

Further objects will appear hereinafter. The weight is shown in a presently preferred form, but various changes may be made, without departing from the spirit of the invention, as described and claimed herein.

FIGURE 1 is a side elevation of a weight, pendent, and partly broken away, with its locking means in process of being unlocked.

FIGURE 2 is a transverse section on the line 2—2 of FIGURE 1, with the locking means unlocked, and illustrating the operation of engaging the mesh with or disengaging it from the weight, and FIGURE 3 is a similar view, showing the locking means in locked position.

FIGURE 4 is a bottom plan view, partly broken away.

FIGURE 5 is a reduced scale front elevation of a weight pendent from the lower edge of a curtain, but not being drawn forwardly.

FIGURE 6 is a similar side elevation of a weight suspended from a curtain, and dragging the bottom, during use.

The weight, one of many distributed along the lower edge of a curtain, for example, comprises a non-buoyant body indicated generally by the numeral 1. The upper surface 10 is formed as a hydrofoil or water reaction surface. Keel means, such as the ridge 12 running fore and aft along the upper surface, tends by water reaction to maintain the body 1 during its advance always oriented in the direction of drag. The point of support for the body from the net is well forward, as represented by the ring 2 in the hole 13. This tends to prevent over-tilting of the weight forwardly as it drags over the bottom. Water reaction on the uptilted surface 10, while the weight is being dragged forwardly, tends to urge the weight as a whole strongly downwardly despite its small mass and bulk.

This tilting of the weight to present its hydrofoil surface 10 at the desired angle of attack is effected by engagement of a cage 3, pendent beneath the body 1, with the bottom. The cage includes a pendent frame 31 preferably of U-shape (FIGURES 3 and 5) directed transversely beneath the body's forward edge. This drags the bottom, as in FIGURE 6, when dragged forwardly but is rounded so that it will not "mud in." It rides over obstructions, and if mud should gather ahead of it, the mud can ride over the frame 31 and drop behind it, without an appreciable increase in drag. A brace 32 constituting part of the cage 3, may extend rearwardly and curve upwardly from the lowermost part of the frame 31 to the after edge of the body 1. It has no tendency to collect mud, and acts to supplement the keel 12 in guiding the body straight ahead. It also reinforces the frame 31, and forms with frame 31 a protective enclosure.

It should be noted particularly that the blunt lower forward conformation of the cage—the portion which engages the bottom—is not designed to plow into the bottom, but to ride thereover, and to tilt the weight as a whole to the angle best suited to present the water reaction surfaces 10 at the most effective angle of attack. If the said portion were not blunt, but rather sharp, as has been proposed for a prior device of somewhat similar appearance, it would plow or burrow into the bottom, provided the bottom was of mud, and not rocky. This would of course create a large drag force, but one that could not be controlled, and that would vary uncontrollably from a minimum in rocky bottom, ineffective to hold down the net element to which it is anchored, to a maximum in muddy or gravelly bottom, so great that it would tend to tear or break such net element. With the blunt bottom-contacting element the weight of this invention operates uniformly and satisfactorily over any bottom.

It will be noted that the upper surface 10 slopes both ways laterally from the keel 12. This, by water reaction, assists in stabilizing the body against diversion from its straight-ahead direction.

The weight should be held close to the net, in a way to prevent appreciable lateral twisting. The single ring 2, of stainless steel preferably, to avoid corrosion, is intended to engage two adjacent points of the lower edge of the curtain C. Seizing or the like should be avoided, for this and its removal takes time. Accordingly, the ring 2 is formed with a gap 21, wide enough to pass the twine of the curtain. This gap must be open and accessible when a weight is to be engaged or disengaged, but closed against unintended disengagement at all other times. The ring can rotate about its axis within its hole 13, but locking means carried by the body 1 engage the ring 2 and retain it securely in the position, shown in FIGURE 3, wherein the gap 21 is submerged within the body 1, and the twine can only engage its closed upper portion. The locking means as shown comprises a blade 4 movable into and from engagement with the ring. Specifically, and preferably, the blade is mounted upon a leaf spring 41 that urges it towards the ring, whereby it will snap into the gap 21, as in FIGURE 3, and so prevent rotation of the ring, as well as filling the gap, until positively withdrawn. A button or handle 42 beneath the body 1 enables withdrawal of the blade and unlocking of the ring, so that it can be rotated.

The locking means is within the cage 3, and close beneath the body 1, but well above the bottom-engaging portion of the cage, and so is well protected against accidental release. When the weight is to be disengaged, the locking blade 4 is withdrawn, the ring is rotated from the position of FIGURES 3 and 5, wherein it engages the two points of the curtain mesh, and so is oriented in a transverse plane, to the position of FIGURE 2. The twine can now pass freely through the gap 21.

The weight may be of small mass, and even of low density metal, such as aluminum, or of molded nylon, for reliance is placed on the water reaction forces, assisted by drag forces, to urge it downwardly. It drags along the bottom in the attitude shown in FIGURE 6, riding over mud, or letting the mud sift through the cage. The cage supports the body 1, with its water reaction surface at a distance off the bottom, and at the intended angle of attack, so this surface will not mud in and cease to function efficiently. The close coupling of the attaching means 2, and its engagement with the two adjacent points, maintains the weight directed straight ahead, assisted by the several keel means. The weight is of small bulk, and offers little obstruction to the reeling in of the net, nor is it likely to become fouled or disoriented during setting of the net by unreeling it, for the close coupling orients it initially more or less correctly, and the water reaction surfaces insure its final correct orientation.

It has been stated that the ring 2 engages two points of the mesh's lower edge (see FIGURE 5) and that this edge is devoid of seizing or other reinforcement. Were the lower edge to be reinforced, and were the weight to snag or hang up on the bottom, the mesh above the reinforced lower edge would be weakest, and it is this which would tear. The tear would be quite extensive, for the stronger edge would resist parting. It follows that extensive repairs would be required. Since the lower edge herein is no stronger than the mesh in general, any snagging of a weight will concentrate the forces on the points where it is suspended, and these alone will tear or part. The weight may be lost, but the net damage is minor, and is quickly repaired.

I claim as my invention:

1. A weight such as in use may be distributed along the lower edge of a curtain or like mesh element of a trawl net to hold such edge to the bottom, and to drag thereover, comprising a body formed with water reaction surfaces directed lengthwise of its upper portion, and means to suspend the body only at a single point located adjacent its upper forward edge from the mesh's lower edge, means adjacent its lower forward portion to engage and drag over the bottom and so to tilt the body about its point of suspension, said body's water reaction surfaces being thereby inclined rearwardly and upwardly, in use, from its point of suspension, whereby the water reaction on such surfaces as it is dragged forwardly produces a downward force on the weight.

2. A weight as in claim 1, including an element depending from the rear edge of the body, and oriented in the fore and aft direction by water reaction while the body is being dragged forwardly, as a keel to maintain the body in its intended line.

3. A weight as in claim 1, including keel means formed on the weight and directed fore and aft, to guide the weight by water reaction, in the line of drag.

4. A weight as in claim 1, wherein the bottom-dragging means includes a generally semicircular frame depending beneath the forward portion of the body and opening forwardly, with its lower edge rounded to ride over the bottom, and thereby to tilt the body's water reaction surfaces to their operative position.

5. A weight as in claim 1, wherein the suspending means includes a ring formed with a fixed gap through which meshes of the net may enter when the gap is exposed, the body having a transverse hole located in its upper forward portion, wherein the suspending ring is rotatively engaged, and by its rotation encloses the gap within the body or exposes the gap, and locking means carried by the body and engageable within the ring's gap to prevent unintended rotation of the ring from its gap-enclosed position, but upon disengagement permitting rotation of the ring to expose the gap for engagement or disengagement of the meshes.

6. A weight such as in use may be distributed along the lower edge of a curtain or like element of a trawl net, to hold it to the bottom, comprising a non-buoyant body formed with a hole in its upper forward portion and a dependent open frame rounded to drag over the bottom, a ring rotatable about its axis within said hole, and formed with a fixed gap through which meshes of the net may enter when the gap is external of the hole, whereby to suspend the body from the net element, and locking means carried by the body and engageable within the gap of the ring to retain the gap within the hole, and so to prevent unintended disengagement of the body from the net.

7. A weight as in claim 6, wherein the locking means comprises a blade movable radially of the ring, and of a size and positioned to enter the ring's gap when the gap is within the hole.

8. A weight as in claim 7, including a spring leaf supporting the blade from the body, and urging the blade into locking, gap-engaging position.

9. A weight as in claim 7, wherein the dependent frame constitutes part of a cage formed on and depending from the body, and a release handle operatively connected to said blade, and located within and protected by said cage.

10. A weight to hold down a trawl net element close to the bottom, comprising a body and a depending cage blunt at its lower edge for dragging over the bottom, to tilt the body, and to hold the body above the bottom, means adjacent and above the forward portion of the body for suspending the same from the net element, the body being formed with water reaction surfaces which, when the body is tilted as it is dragged, react with the water to produce a downwardly directed force independent of any gravitational force on the body.

11. A weight as in claim 10, including directional guidance means to maintain the water reaction surfaces oriented to produce the downward force.

References Cited in the file of this patent

UNITED STATES PATENTS

| | | |
|---|---|---|
| 702,955 | Johnson | June 24, 1902 |
| 1,453,987 | Mills | May 1, 1923 |
| 2,224,073 | Augenstein | Dec. 3, 1940 |
| 2,504,091 | Scheel | Apr. 11, 1950 |
| 2,623,323 | Knott et al. | Dec. 30, 1952 |
| 2,663,113 | Tongson | Dec. 22, 1953 |
| 2,816,385 | Luketa | Dec. 17, 1957 |
| 2,890,542 | Willingham | June 16, 1959 |

FOREIGN PATENTS

| | | |
|---|---|---|
| 75,189 | Denmark | Dec. 22, 1952 |
| 80,133 | Denmark | Oct. 31, 1955 |
| 407,237 | France | Dec. 24, 1909 |
| 6,736 | Great Britain | Mar. 30, 1905 |